(12) United States Patent
Kurtz (10) Patent No.: US 7,866,215 B2
(45) Date of Patent: Jan. 11, 2011

(54) REDUNDANT SELF COMPENSATING LEADLESS PRESSURE SENSOR

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 96 days.

(21) Appl. No.: 12/286,810

(22) Filed: Oct. 2, 2008

(65) Prior Publication Data

US 2010/0083764 A1 Apr. 8, 2010

(51) Int. Cl.
G01L 9/06 (2006.01)
(52) U.S. Cl. .......................................... 73/721; 73/727
(58) Field of Classification Search ........................ None
See application file for complete search history.

(56) References Cited

U.S. PATENT DOCUMENTS

| 6,293,164 | B1 | 9/2001 | Kurtz |
| 7,057,247 | B2 | 6/2006 | Kurtz et al. |
| 7,178,403 | B2 | 2/2007 | Kurtz |
| 7,647,836 | B2 * | 1/2010 | O'Brien et al. ............... 73/756 |
| 2006/0144153 | A1 * | 7/2006 | Brosh .......................... 73/715 |

* cited by examiner

Primary Examiner—Andre J Allen
(74) Attorney, Agent, or Firm—James E. Schutz, Esq.; Dean Y. Shahriari; Troutman Sanders LLP (57) ABSTRACT

There is disclosed a redundant pressure sensing chip which includes first and second redundant devices. Each pressure sensing device produces an output proportional to applied pressure irrespective of vibration/acceleration of the device. Each device also provides an output proportional to pressure and because of the nature of the devices, thermal effects as well as acceleration and the vibration are canceled. Based on chip operation and subtracting the signals from the two diaphragms, acceleration/vibration is canceled but also the effects of absolute pressure and differential pressure is also canceled. Therefore the chip can be used as a redundant absolute pressure sensor as well as a differential pressure sensor.

22 Claims, 10 Drawing Sheets

REDUNDANT SELF COMPENSATING LEADLESS PRESSURE SENSOR

FIELD OF THE INVENTION

This invention relates to pressure sensors and more particularly to a compensated, redundant absolute pressure transducer and to a compensated differential transducer.

BACKGROUND OF THE INVENTION

Piezoresistive sensor structures are widely used in measuring pressure or force. The prior art is replete with a number of patents which describe various configurations and methods of fabricating piezoresistive pressure sensing devices. Essentially the assignee herein Kulite Semiconductor Inc. has many patents which describe various type devices. As one will ascertain relatively popular devices are the differential and absolute pressure sensors. A differential pressure sensor employs a differential transducer which provides an output which is the difference between two pressures.

In the particular case of the gage sensor one of these pressures is atmospheric pressure and the other pressure is the pressure to be measured. In this case, the output of the differential transducer is the measured pressure minus atmospheric pressure.

In the absolute pressure transducer, the output is solely indicative of a pressure applied. Thus as indicated above there are many implementations of such transducers and for example, reference is made to U.S. Pat. No. 7,057,247 issued on Jun. 6, 2006 to A. D. Kurtz, et al, the inventor herein, and entitled Combined Absolute Differential Transducer. That patent discloses an absolute differential pressure transducer on a single wafer. In any event and as one can ascertain, an extremely difficult problem in designing absolute pressure transducers is the measurement of the zero pressure.

In zero pressure, the output of the absolute transducer should be zero. In any event, as is the case of most semiconductor elements, the output at zero pressure undesirably changes. These changes are due to temperature, hysteresis, as well as other factors such as slight flaws in manufacturing and so on. Thus, the absolute pressure transducer had to be compensated using various output resistors or using temperature sensitive devices. The compensation of such units at zero pressure required excessive time in order to compensate these devices efficiently and employed additional components which added to the total cost. As one can ascertain, there are many techniques described in the prior art which are employed to compensate pressure transducers for temperature effects as well for hysteresis and other effects. The assignee herein Kulite Semiconductor Products has assigned patents which show vibration compensated pressure sensing assemblies.

Reference is made to U.S. Pat. No. 6,293,154 entitled Vibration Compensated Pressure Sensing Assembly issued on Sep. 25, 2001 to A. D. Kurtz, the inventor herein, and assigned to Kulite Semiconductor Products, Inc. the assignee herein. In that patent there is described a pressure sensing device for producing an output proportional to an applied pressure irrespective of vibration and acceleration of the device. Basically the device uses a first and a second piezoresistive structure which are formed on the same chip. One of the sensors receives a pressure plus a vibration and acceleration while the other device receives only acceleration and vibration. By combining piezoresistors from the first and second device, one obtains an output whereby vibration and acceleration cancel and only pressure is provided. This is an extremely important invention.

In any event, reference is also made to U.S. Pat. No. 7,178,403 issued on Feb. 20, 2007 and invented by A. D. Kurtz, the inventor herein, and commonly assigned. The patent is entitled Transducer Responsive to Pressure, Vibration/Acceleration and Temperature and Methods of Fabricating the Same. Essentially in that patent there is described a device which produces an output proportional to applied pressure irrespective of vibration/acceleration of the device, which device also provides an output proportional only to vibration/acceleration of the device irrespective of the pressure.

It is the intent of the present invention to utilize the devices depicted in the above-noted patents as an absolute transducer and to make the device redundant on a single chip so that a user can obtain extremely accurate measurements of absolute pressure without concern over errors as zero pressure as promulgated by prior art devices.

It is also an intent to provide an improved differential transducer, on a single redundant chip, and to provide a differential and absolute transducer.

SUMMARY OF THE INVENTION

A redundant pressure sensing device for producing a first and a second output proportional to an applied first and second pressure irrespective of vibration and acceleration of said device, comprising: a chip having a first pressure sensing device including first and second deflectable diaphragms, said chip having a second relatively identical pressure sensing device including third and fourth deflectable diaphragms, said first and second pressure sensing devices electrically separated on said chip by an isolation groove; a plurality of piezoresistors mounted on each deflectable diaphragm; wherein said plurality of piezoresistors on said first and second diaphragms are electrically coupled together to provide a first output substantially proportional to only said first pressure; and wherein said plurality of piezoresistors on said third and fourth diaphragms are electrically coupled together to provide a second output substantially proportional to only second pressure wherein said first and second outputs are substantially devoid of variations due to vibration, acceleration and thermal zero offset changes of said device.

DETAILED DESCRIPTION OF THE FIGURES

Before proceeding with a detailed description of the Figures, it is indicated that there are a number of Kulite patents which are pertinent to the Figures to be described herein. A first patent is entitled Vibration Compensated Pressure Sensing Assembly issued on Sep. 25, 2001 as U.S. Pat. No. 6,293,154 and issued to Anthony D. Kurtz, an inventor herein. The second patent issued on Feb. 20, 2007 entitled Transducer Responsive to Pressure, Vibration/Acceleration and Temperature and Methods of Fabricating the Same. This patent issued as U.S. Pat. No. 7,178,403 also to Anthony D. Kurtz, the inventor herein. Essentially both patents show a pressure sensing device for producing an output proportional to an applied pressure irrespective of vibration and acceleration of the device and both patents are incorporated herein in their entirety. The device includes a first deflecting diaphragm formed in a first wafer and including a first plurality of piezoresistors mounted thereon. The first diaphragm is responsive to an applied pressure and also to vibration of the device. The second diaphragm includes a second plurality of piezoresistors and is only responsive to vibration of the device. In this manner, the first and second pluralities of resistors are electrically coupled together to provide a common output such that they cooperatively at least partially cancel a portion of the common output associated with the vibration of the device. As one can understand from reviewing the above-noted patents, not only is vibration canceled but acceleration would also be canceled in the configuration depicted. Reference is now made to U.S. Pat. No. 7,178,403 this patent also shows a pressure sensing device which produces an output proportional to an applied pressure, again irrespective of vibration/acceleration of the device. The device can also be made to provide an output proportional only to vibration/acceleration of the device irrespective of pressure. Thus as seen in the above-noted patents, there is described vibration and acceleration compensated pressure transducers. As one can ascertain, the pressure transducers described in the patents, as indicated above, have a similar configuration but operate in a different manner. Thus in regard to the present application, reference is made to FIG. 1.

Figure 1:
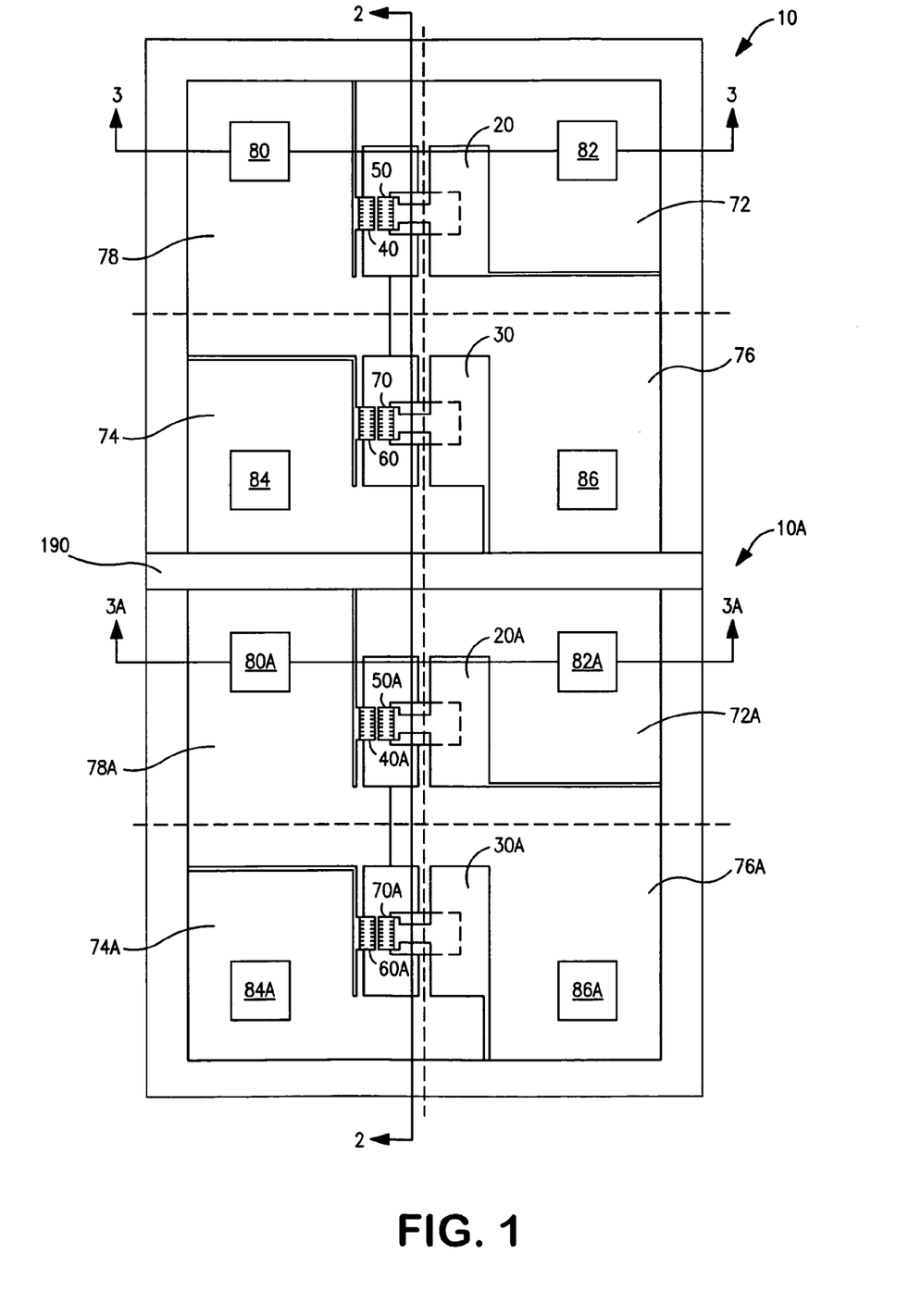
FIG. 1 is a top plan view of a redundant absolute pressure sensor chip according to this invention.

FIG. 1, as one can ascertain, is FIG. 1 of U.S. Pat. No. 6,293,154 and essentially is the published figure. In any event, as one will see from FIG. 1 of the present invention there are two pressure sensing devices formed on the same semiconductor chip as will be explained. Each semiconductor device is a pressure sensing device for providing an output proportional to an applied pressure irrespective of vibration or acceleration of the device. As seen in FIG. 1, each semiconductor device is fabricated on a single chip and is separated by a groove 190. The groove 190 is shown much clearer in FIG. 2.

Figure 2:
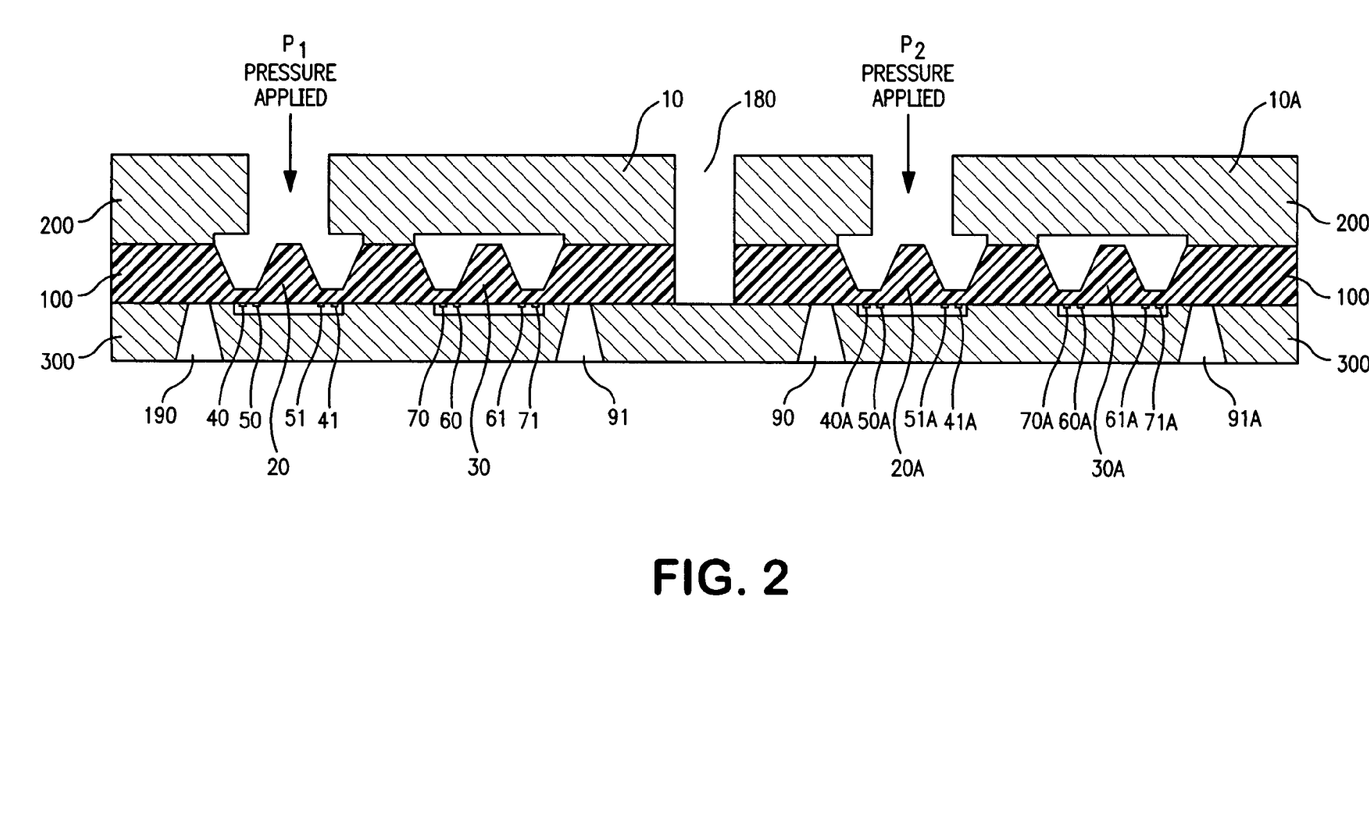
FIG. 2 is a cross-sectional view of the pressure transducer taken through line 2-2 of FIG. 1.
Figure 3:
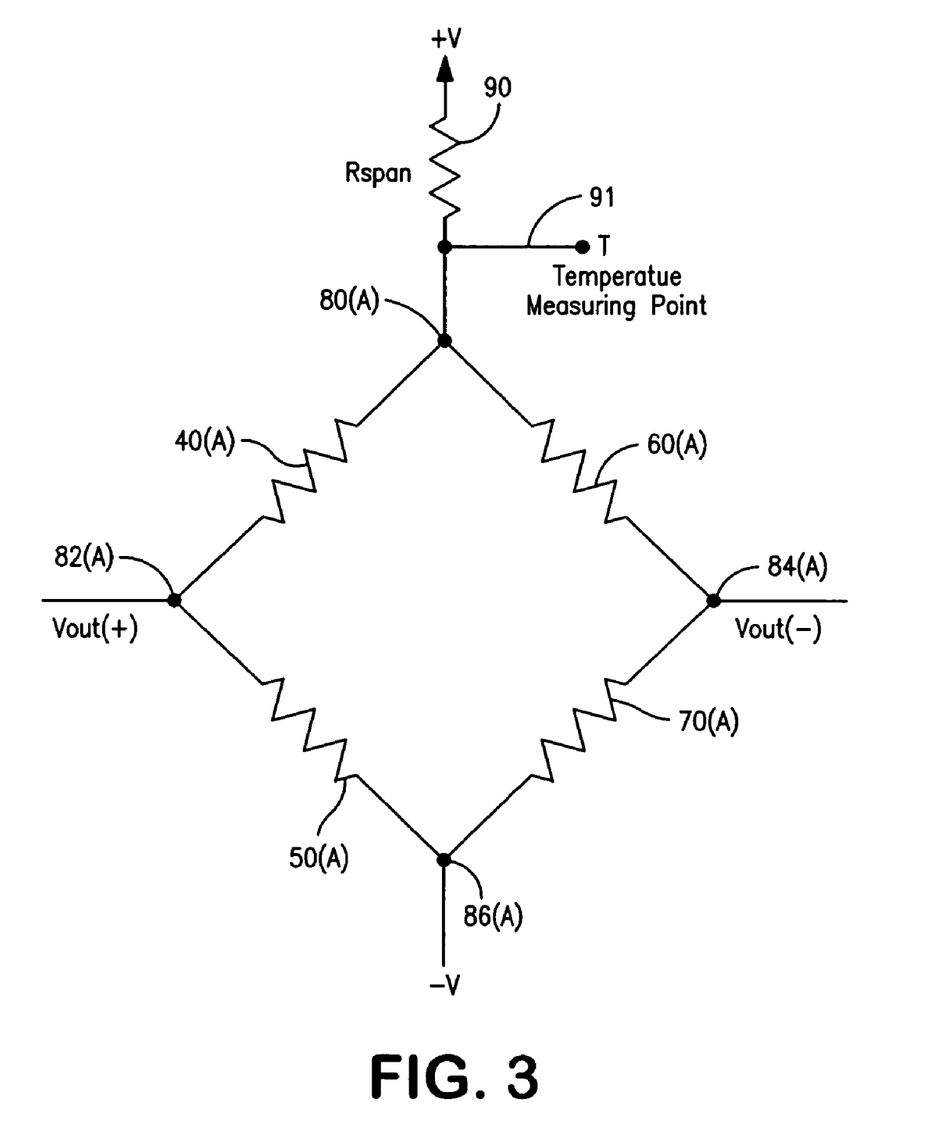
FIG. 3 is a schematic view of a Wheatstone bridge arrangement employed in this invention.

Again, referring to the above-noted patents, FIG. 2 is equivalent to FIG. 3 of U.S. Pat. No. 7,178,403 with the exception that there are two device structures shown in FIG. 2 which are formed on the same substrate and which are separated by the groove 190 as indicated in FIG. 1. Each device as explained in the above-noted patents is capable of producing an output directly proportional to an applied pressure and irrespective of the vibration/acceleration of the device. Thus as seen in FIG. 1, there is shown a first pressure sensing device 10 and a second pressure sensing device 10A, both of which are formed and integrated on the same chip. The chip contains two separate pressure devices indicated as 10 and 10A, each device as 10 and 10A are identical. Each device, as 10 and 10A, has two separate deflectable diaphragms as 20 and 30, for device 10 and 20A and 30A for device 10A. Each diaphragm may contain at least two piezoresistors as 40 and 50 for diaphragm 20 and 60 and 70 for diaphragm 30 electrically coupled in series and formed in the wafer section 10. As also indicated, each diaphragm may contain 4 piezoresistors instead of 2. In any event, as seen device 10 contains piezoresistor devices 40 and 50 associated with diaphragm 20 and also includes piezoresistors 60 and 70 associated with diaphragm 30. In a similar manner, the chip section 10A includes piezoresistors 40A and 50A associated with diaphragm 20A and resistors 60A and 70A associated with diaphragm 30A. Piezoresistors 40, 60, 40A and 60A decrease with positive normal stress and piezoresistors such as 50, 70, 50A and 70A each increase with positive normal stress. The piezoresistors from each of the chip 10 and 10A are electrically interconnected to form a full bridge such as shown in FIG. 3.

Thus as shown in FIG. 3, the bridge is a Wheatstone bridge and includes from one chip, resistors 40, 50, 60 and 70 arranged as shown, while the other bridge includes resistors 40A, 50A, 60A and 70A arranged as shown in FIG. 3. In any event, as shown in FIG. 2 there is shown a cross-section of the chip taken through line 2-2 of FIG. 1. Essentially as indicated, FIG. 2 shows the chip depicted in U.S. Pat. No. 7,178,403 but as indicated again, includes two sections. The chip configuration in the above-noted 403 patent is shown in FIG. 3 and the Wheatstone bridge is shown in FIG. 4. Therefore, based on FIG. 1, the same reference numerals have been employed to depict the components shown in FIG. 1. Essentially as seen, there is a common substrate 300 which is preferably fabricated from silicon. As indicated above, each device as 10 and 10A of FIG. 1, has two diaphragms as 20 and 30 for device 10 and 20A and 30A for device 10A. Each diaphragm basically contains a thinned area formed in the wafer which is capable of deflecting upon application of the suitable force or pressure. The fabrication of such diaphragms as 20, 30, 20A, 30A on a silicon wafer is well known. Each diaphragm 20 and 30 contains two sets of piezoresistors. For example, diaphragm 20 contains piezoresistors 40 and 50 as well as piezoresistors 41 and 51. Piezoresistors 41 and 51 are not used but can be provided for redundancy or for additional purposes. Also shown on diaphragm 10A are piezoresistors 40A and 50A as well as piezoresistors 41A and 51A. As is known, and as is indicated above, piezoresistors 40, 40A, 60, 60A and 51, 51A and 71, 71A decrease with positive normal stress applied to the respective diaphragms 20, 20A and 30, 30A. In a similar manner, diaphragm 30 contains piezoresistors 60 and 70 as well as piezoresistors 61 and 71. Hence diaphragm 30A contains piezoresistors 60A and 70A as well as piezoresistors 61A and 71A. As is known, piezoresistors 40, 40A, 60, 60A and 51, 51A and 71, 71A decrease with positive normal stress applied to the respective diaphragms 20, 20A and 30, 30A. In a similar manner, piezoresistors 50, 50A, 70, 70A and 41, 41A and 61, 61A increase with positive normal stress applied to these diaphragms. The piezoresistors 40, 50, 60 and 70 are electrically connected to form a full Wheatstone bridge such illustrated, for example in FIG. 3. It is of course seen that a first bridge would be associated with device 10 while a second bridge consisting of resistors 40A, 60A, 70A and 50A would be associated device 10A.

Referring back to FIG. 1 the biasing and output terminal or pads such as 80, 82, 84 and 86 associated with device 10 and pads 80A, 82A, 84A and 86A associated with device 10A are depicted. These areas are metalized areas which form large contact areas for the appropriate terminals of the Wheatstone bridge configuration. These terminals are shown in FIG. 3 as 80, 80A, 82, 82A, 84, 84A and 86, 86A. Thus as seen from FIG. 3, piezoresistors 40 and 50 associated with deflectable diaphragm 20 form one-half of the Wheatstone bridge while resistors 60 and 70 associated with the deflectable diaphragm 30 form the other half of the Wheatstone bridge. Thus referring to device 10A, it is also shown that piezoresistors 40A and 50A associated with deflectable diaphragm 20A form one-half of the Wheatstone bridge while resistors 60A and 70A associated with deflectable diaphragm 30A form the other half of the Wheatstone bridge. Thus as one can ascertain from the configuration depicted in FIG. 3, the bridge will provide an output at terminals 82 and 84 which is strictly responsive to pressure and is not responsive to vibration or acceleration, as will be further explained. A conventional biasing voltage is applied to the bridges via terminals 80, 80A and 86, 86A with either terminal serving as a point of reference potential and the other terminal receiving operating potential. There is also shown a span resistor 90 associated with the bridge which operation is well known in the prior art. In any event, without going into greater detail, the device and fabrication of the device is depicted in U.S. Pat. No. 7,178,403 as well as in U.S. Pat. No. 6,293,154. The difference being that the device is redundant on a single chip.

As seen in FIG. 2, the application of a pressure $P_1$ applied to the device 10 directly impinges on diaphragm 20. The cover member 200 of device 10 does not allow the pressure $P_1$ to be applied to diaphragm 30. In a similar manner, the pressure $P_2$ is applied to diaphragm 20A while the cover member 200A prevents the application of the pressure $P_2$ to be applied to diaphragm 30A. Thus as one can see from FIG. 2, the application of pressure will cause diaphragm 20 to deflect but will not cause any deflection in diaphragm 30. In a similar manner, the output application of pressure $P_2$ will cause diaphragm 20A to deflect but will not cause any deflection in diaphragm 30A. Both diaphragms as the entire chip are formed in sufficient proximity to one another, that the deflection caused in each of the diaphragms by vibration and/or acceleration will be approximately the same. Thus vibration or acceleration experienced in diaphragm 20 will be the same as that experienced in diaphragm 30 and the acceleration experienced in diaphragm 20A will be the same as the acceleration and vibration in diaphragm 30A. The devices 10 and 10A are electrically separated by the groove 190 and the only common connection is the insulating substrate 300. Substrate 300 is basically fabricated from glass or some other insulating material, including oxidized silicon. This is explained in the above-noted patents. In any event, as shown in FIG. 1 and FIG. 2, there is depicted a device which contains separate pressure sensors as 10 and 10A which pressure sensors 10 and 10A are positioned on a common substrate 300 and are separated on the substrate by a groove 190. The groove 190 prevents, as indicated, electrical current or flow from device 10 to 10A and essentially electrically isolates the devices one from the other. The use of a redundant pressure sensor as 10 and 10A on a common substrate provides for more accurate absolute and differential pressure measurements. In this device, the 0 psiA pressure is maintained on both sides of the inactive diaphragm 30 because it is hermetically sealed by the cover members 200 and 300. In a similar manner, unit 10A also has diaphragm 30A at 0 psiA on both sides. The active diaphragm 20 is hermetically sealed on the back side by cover member 300 and thus has a reference (0 psiA) pressure on the back side at all times. In operation, when 0 psiA ($P_1$) is applied to the front of the active diaphragm 20 it causes the diaphragm 20 to see equal pressures on both sides, thus producing a stress (or strain) free state, which is equivalent to the state of diaphragm 30, which always is under 0 psiA pressure from both sides. It is indicated when this device is used as an absolute pressure sensor there are no offsets due to temperature variations as all such offsets are canceled. This is further enhanced by the fact that both chip sections 10 and 10A are fabricated at the same time using the same processes and therefore have very close operating characteristics. In this manner, the zero absolute pressure measurement is extremely accurate as there is no offset from zero pressure measurement in an absolute sensor due to thermal mismatch and so on as these characteristics are eliminated when a Wheatstone bridge according to FIG. 3 is formed. Further, both pressures $P_1$ and $P_2$ in regard to absolute measurements can be the same and therefore one would obtain two outputs indicative of absolute pressure from the same exact device to therefore enable redundant operation which would be necessary in harsh environments including accelerations or vibrations. Such an environment for example may be in conjunction with aircraft engines, automobile engines and other devices where one would desire to measure pressure in a high vibration environment and to also obtain a pressure which is independent of vibration. In any event, the use of the above-noted redundant chip enables one to do so.

Figure 4:
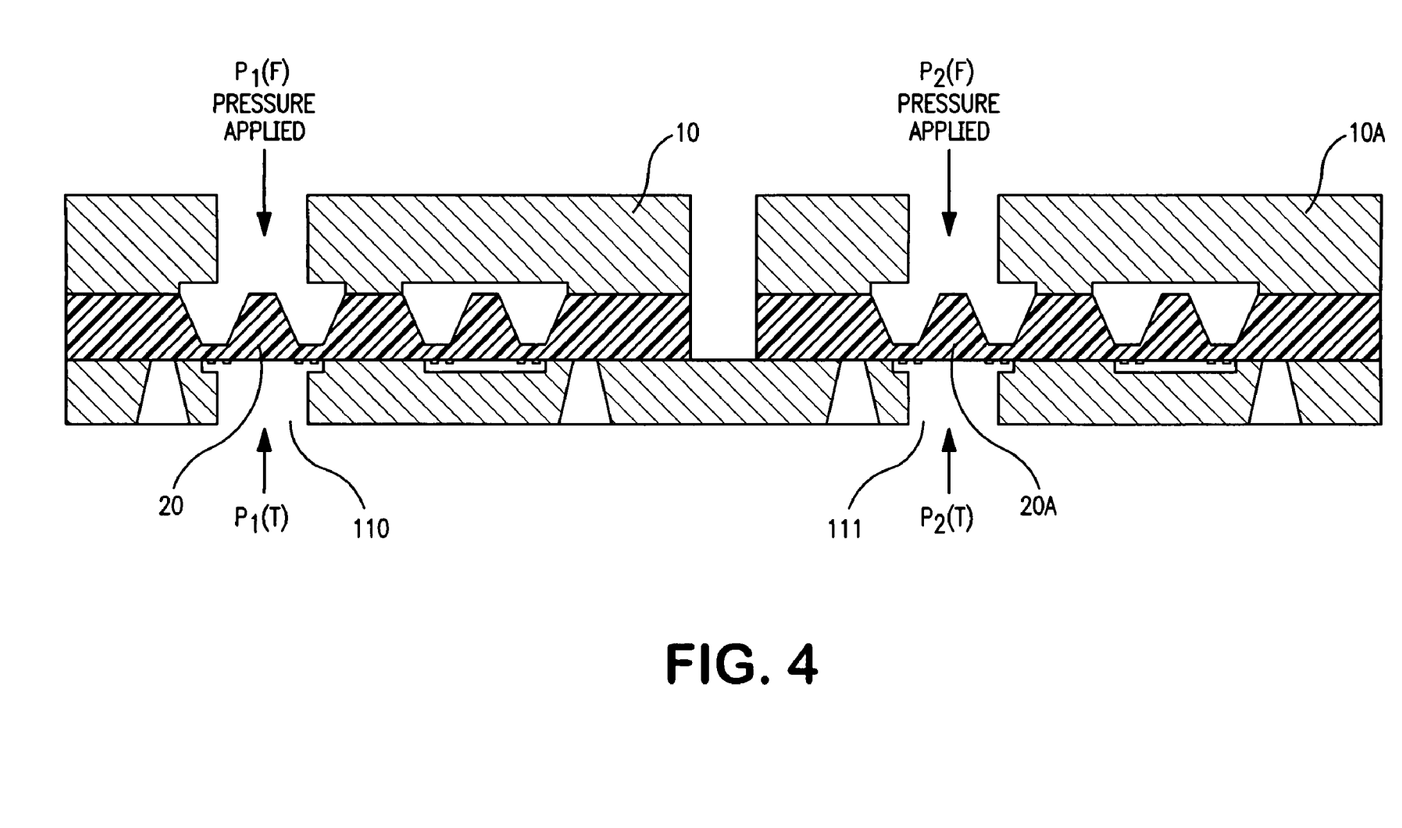
FIG. 4 is cross-sectional view of a differential compensated, redundant chip.

Referring to FIG. 4 there is shown a cross-sectional view of a differential compensated redundant chip. Essentially, in order to avoid confusion, the chip shown in FIG. 4 is identical to the chip shown in FIG. 2 with the exception that there are two bottom surface apertures, namely 110 and 111. Each of the apertures communicates with the underside of the respective diaphragm. Aperture 110 communicates with the underside of diaphragm 20, while aperture 111 communicates with the underside of diaphragm 20A. In this manner, an additional pressure such as $P_1(T)$ and $P_2(T)$ can be applied. As one can ascertain, FIG. 4 looks similar to FIG. 2 with the exception of the apertures. The apertures enable the differential pressures to be applied to both diaphragms. Thus pressure is applied to the front side of the diaphragm and to the reference side of the diaphragm. In this manner, the Wheatstone bridge configurations will produce a differential pressure from each of the redundant chips. Thus chip section 10 will produce an output proportional to $P_1(F)-P_1(T)$ while the chip 10A portion will produce a differential output proportional to $P_2(F)-P_2(T)$. The differential compensated, redundant transducer works using the same principles as the absolute compensated, redundant transducer depicted in FIG. 2. The 0 psi measurement in both the active and the hermetically enclosed diaphragms will cancel out. The difference between the differential compensated and the absolute compensated devices will only lie in the fact that 0 psi state on the active diaphragm is achieved differently. In the absolute design, the 0 psiA stress free state on the active diaphragm is achieved when 0 psiA is applied to the device (active diaphragm 20), while in the differential design, it is achieved when the initial pressure is applied equal on both sides (front/reference) of the active diaphragm 20. The state of the inactive diaphragm 30 remains the same. In order to accurately apply the pressures as depicted in FIG. 4 as $P_1(T)$ and $P_2(T)$ one has to employ tubes, which tubes are introduced in the headers in proper location. The pressure is applied to the front side of the diaphragm in a normal manner and to the reference side via the tubes.

Figure 5:
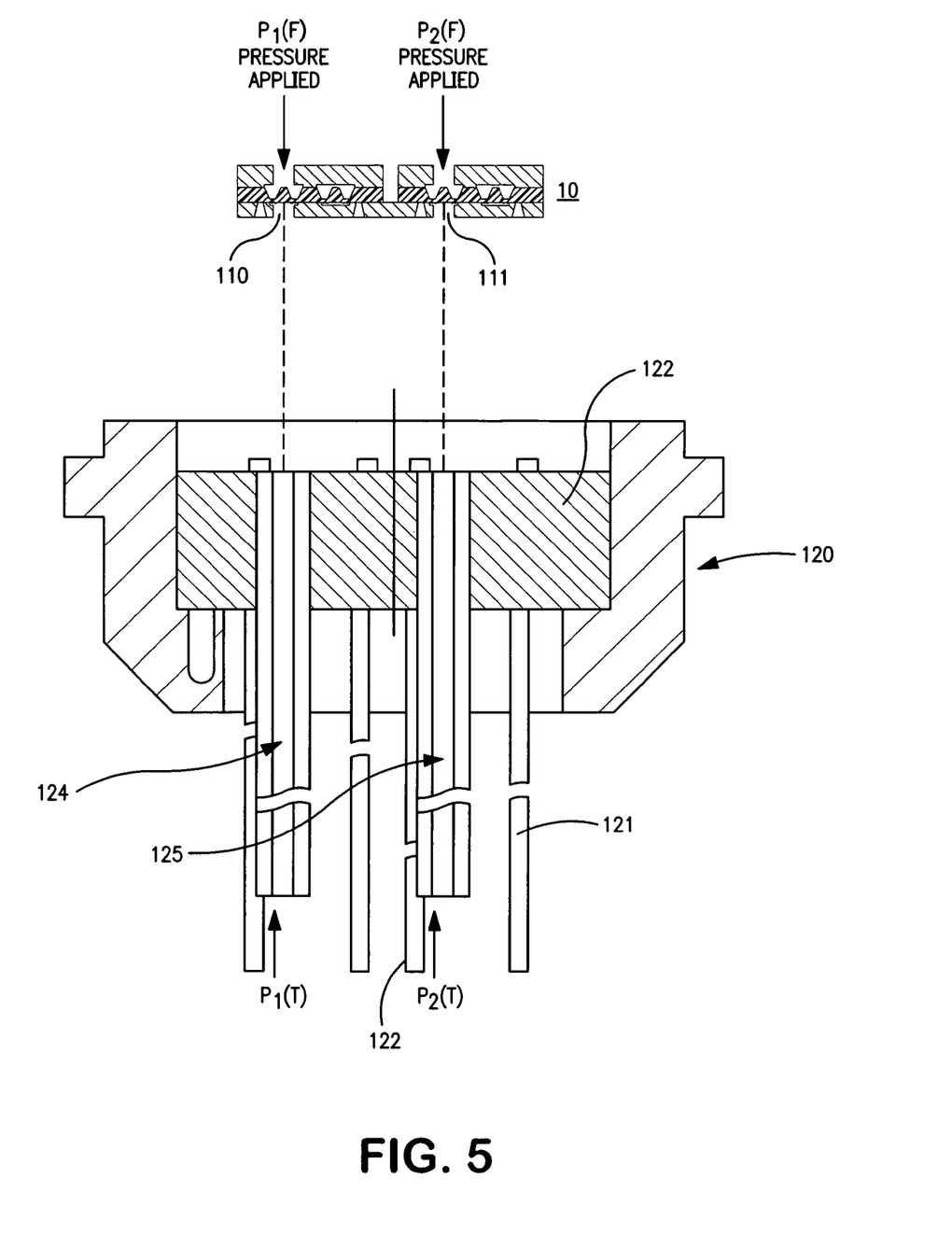
FIG. 5 is a cross-sectional view showing a header employing the chip of FIG. 4.

The tubes as shown in FIG. 5 as 124 and 125 and the tubes are located right underneath the lower surface of the active diaphragm on both the main and the redundant chip section 10 and 10A. Thus as seen, the chip 10, as depicted, is placed on a glass header 122, which glass header has apertures for accommodating the reference tubes 124 and 125. The chip, once placed, enables the pressures as $P_1(T)$ and $P_2(T)$ to be applied directly underneath the associated diaphragms. In this manner, a differential transducer is provided.

Figure 6:
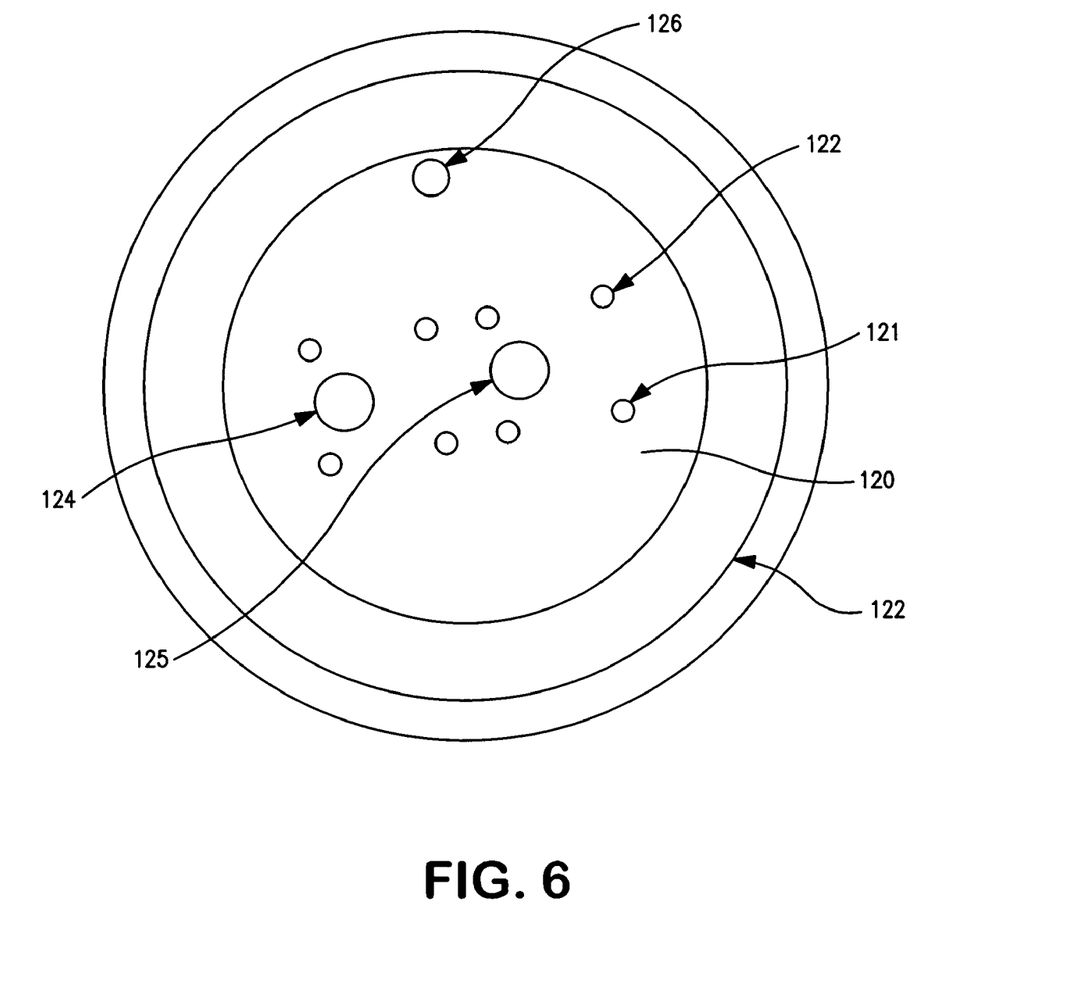
FIG. 6 is top view of the differential compensated, redundant header.

Referring to FIG. 6 there is shown a top view of the header for the differential compensated chip depicted in FIG. 4. As seen, the reference tubes are shown as 124 and 125, the pins 121 and 122, and the header 120 with the glass header 122. As noted, there are many more pins than 121 and 122, all of which are associated with the redundant chip in order to bring out the appropriate terminals for the Wheatstone bridge configurations, as for example, depicted in FIG. 3. It is also understood that in regard to the redundant chip there are two Wheatstone bridges that can be formed from each of the respective chip sections as 10 and 10A.

Figure 7:
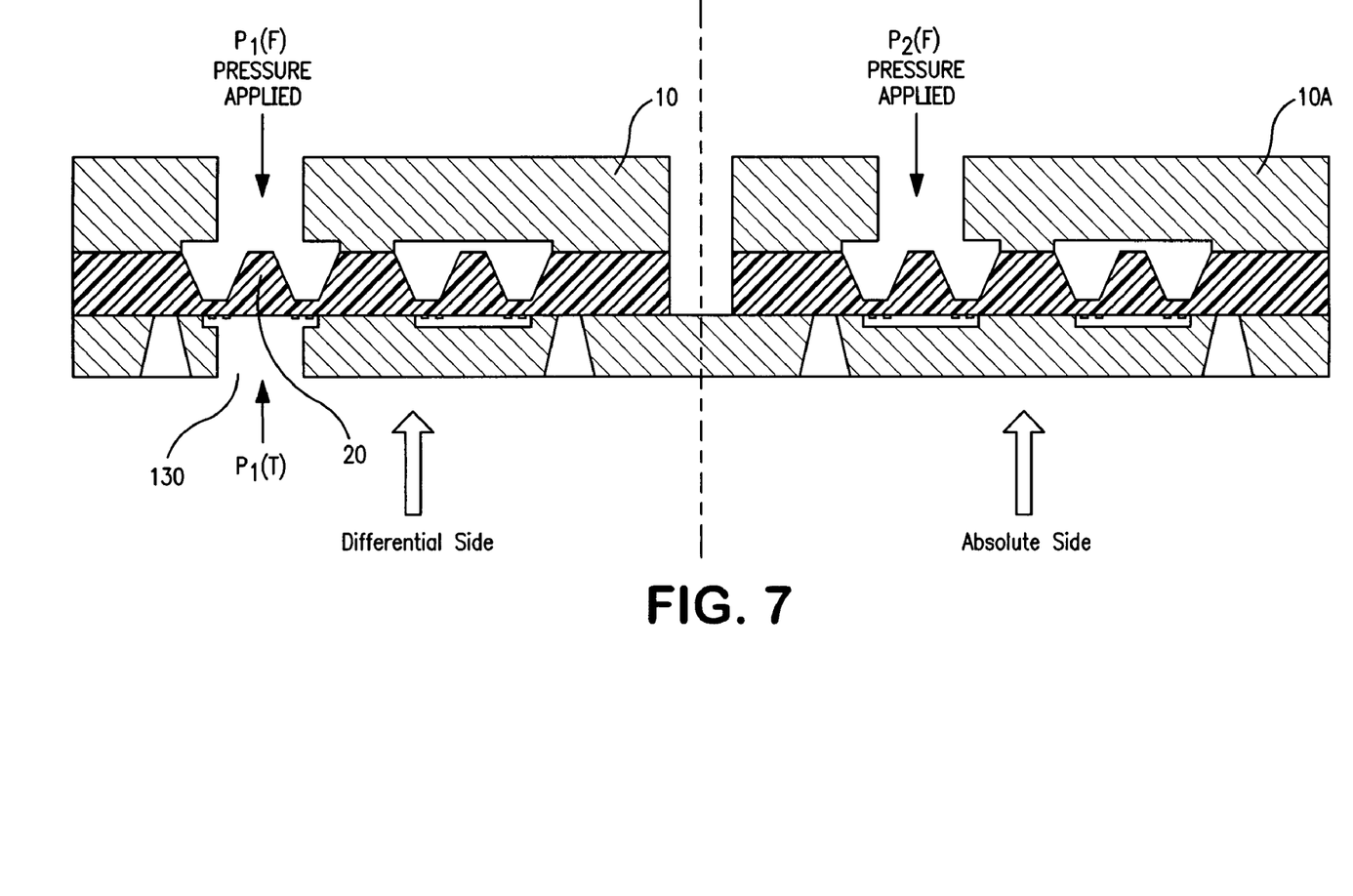
FIG. 7 is cross-sectional view of a combined differential compensated/absolute compensated chip.

Referring to FIG. 7 there is shown a cross-sectional view of another configuration of the chip 10 depicted in FIG. 1. As seen in FIG. 7, one-half of the chip 10 is a differential device having an aperture 130 which communicates with the underside of the diaphragm 20. The other side 10A is an absolute assembly as that depicted in FIG. 2 with the pressure $P_2(F)$ only applied and therefore the device on the absolute side will produce an absolute and a differential output. The differential output of course will be the difference between $P_1(F)$ and $P_1(T)$ while the output on the absolute side will be $P_2(F)$ as referenced to atmospheric pressure.

Figure 8:
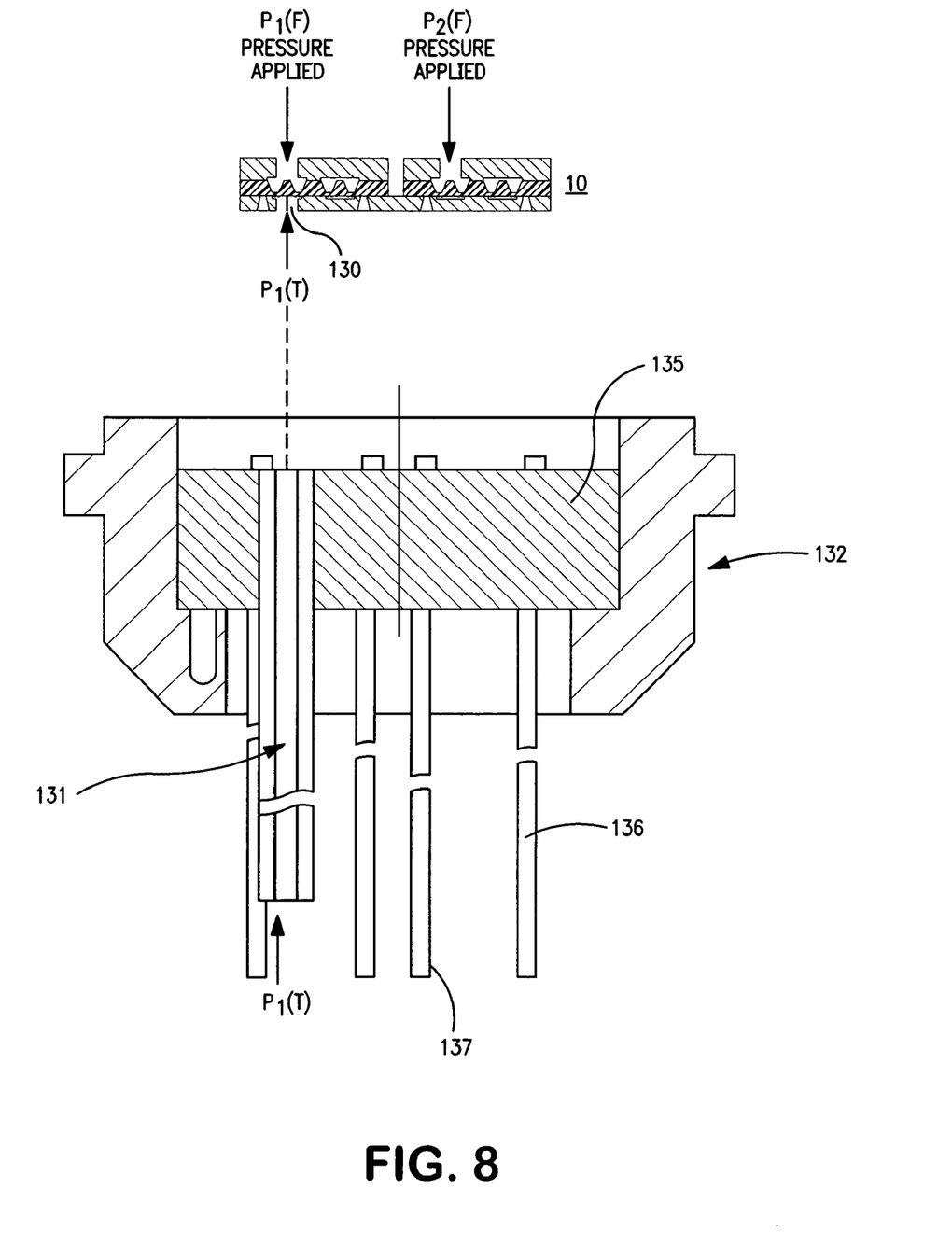
FIG. 8 is a cross-sectional view depicting a differential compensated and absolute compensated header assembly.

Referring to FIG. 8 there is shown a cross-sectional view of a header employed with the chip of FIG. 7. As seen in FIG. 8, the chip again is positioned on the glass substrate 135. The glass substrate is surrounded by a metal header shell 132. There are pins emanating from the glass header shell as 136 and 137 which pins contact with the contact areas or terminals on the chip 10. As seen, there is a reference tube 131 which communicates with aperture 130 and therefore allows for the differential pressure to be measured. As indicated in regard to FIG. 7, the other side of the chip is a absolute transducer.

Figure 9:
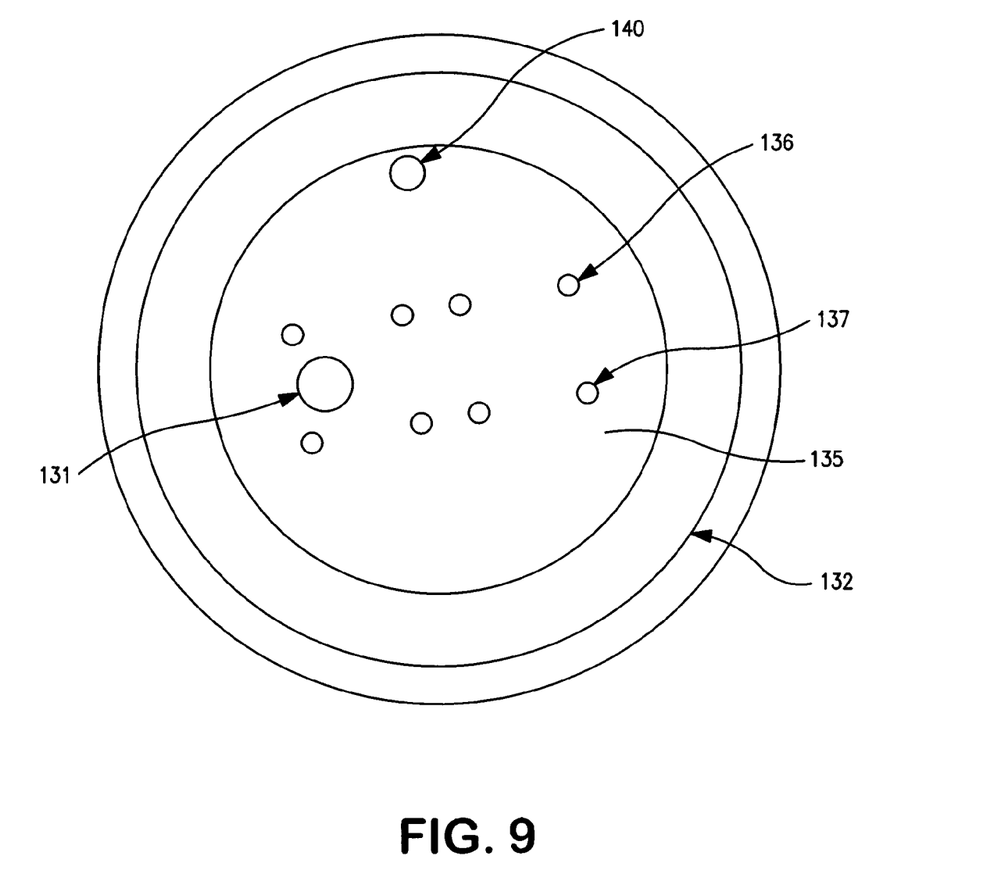
FIG. 9 is a top plan view depicting the header assembly shown in FIG. 8.

Referring to FIG. 9 there is shown a top-plan view of the header of FIG. 8 depicting the pins 136 and 137 and the glass header 135 with the header shell 132. It is also noted that there is an alignment pin 140 associated with the chip. The alignment pin, as is known, operates to allow the chip to be placed in proper position with respect to the pins and with respect to the reference tube 131. As one will also ascertain, there is also an alignment pin associated with the configuration depicted in FIG. 6 as alignment pin 126.

Figure 10:
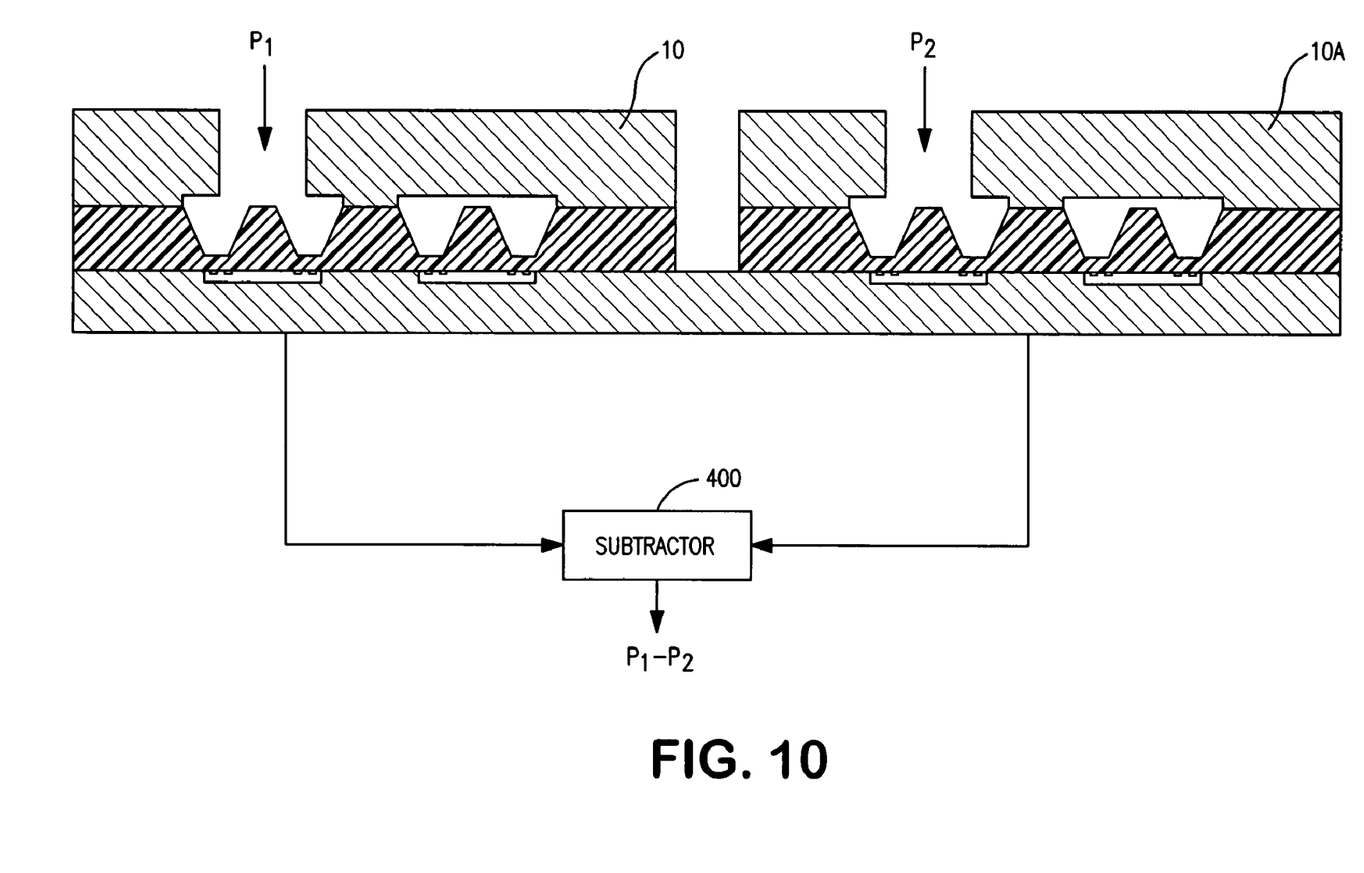
FIG. 10 depicts a differential amplifier which uses the redundant chip to produce a differential output which is compensated.

Referring to FIG. 10 there is shown a chip as depicted in FIG. 2 having pressures $P_1$ and $P_2$ applied thereto. The chip provides an output as each of the bridge circuits formed from the piezoresistors of chip section 10 and 10A provide an output where each output goes to a separate input of the subtractor 400. The subtractor 400 provides an output as $P_1-P_2$ or the difference therefore providing a differential output. Thus for example, the pressure $P_1$ may be in the range of 60 psi where pressure $P_2$ may be in a range of 20 psi, thus the outputs of subtractor 40 would be 40 psi. This is a differential output as indicated, but the output does not have to be compensated in any manner because of the fact that the chip inherently compensates for temperature variations as well as vibration and acceleration variations which is an extreme advantage in providing a differential operation. It is also an extreme advantage in providing absolute operation because of the above-noted problems. For example of other methods and techniques for fabricating two sensors on the same silicon wafer reference is made to U.S. Pat. No. 7,057,247 issued on Jun. 6, 2006 and entitled Combined Absolute Differential Transducer and issued to Anthony D. Kurtz, et al and assigned to Kulite Semiconductor Products, Inc. That patent discloses a combined absolute pressure transducer which consists of two sensors made from the same wafer of silicon and selected to be adjacent to each other on the wafer. In any event, the patent describes various techniques for measuring absolute and differential pressure as well as techniques for fabricating such transducers. That patent is also deemed to be incorporated herein in its entirety.

Thus as indicated above, there is disclosed a redundant compensated pressure transducer which enables one to provide a compensated absolute pressure sensor and to provide a compensated differential transducer. Those of ordinary skill in the art may recognize that many modifications and alterations of the present inventions may be implemented without departing from the spirit of the scope of the invention.

What is claimed is:

1. A redundant pressure sensing device for producing a first and a second output proportional to an applied first and second pressure irrespective of vibration and acceleration of said device, comprising:

a chip having a first pressure sensing device including first and second deflectable diaphragms and a second pressure sensing device including third and fourth deflectable diaphragms, said first and second pressure sensing devices electrically separated on said chip by an isolation groove;

a plurality of piezoresistors mounted on each deflectable diaphragm; wherein said plurality of piezoresistors on said first and second diaphragms are electrically coupled together to provide a first output indicative of a first pressure; and wherein said plurality of piezoresistors on said third and fourth diaphragms are electrically coupled together to provide a second output indicative of a second pressure wherein said first and second outputs are substantially devoid of variations due to vibration and acceleration of said device.

2. The device in claim 1 wherein said first and second devices provide outputs indicative of absolute pressure.

3. The device of claim 2 wherein said first and second pressures are relatively equal.

4. The device of claim 1 further including a subtractor having a first input responsive to said first output and a second input responsive to said second output to provide a subtractor output relatively equal to said first output subtracted from said second output.

5. The device of claim 1 wherein said plurality of piezoresistors form said first and second diaphragms form a Wheatstone bridge.

6. The device of claim 5 wherein said plurality of piezoresistors form a Wheatstone bridge.

7. The device according to claim 1 further comprising a cover member including a first aperture communicating solely with said first diaphragm and a second aperture communicating solely with said third diaphragm wherein said second and fourth diaphragm only receive said associated pressure.

8. The device according to claim 7 wherein said cover member isolated said second and fourth diaphragms from said pressure.

9. The device according to claim 7 wherein said cover member is fabricated from glass.

10. The device according to claim 1 wherein said wafer is silicon.

11. The device of claim 1 wherein said first and second devices provide outputs indicative of differential pressure.

12. The device of claim 1 wherein said first device provides an output indicative of absolute pressure and said second device provides an output indicative of differential pressure.

13. The device according to claim 11 wherein said first and second sensing devices each receive another pressure on a surface of said deflectable diaphragms opposite said surface receiving said first and second pressures to cause said associated piezoresistors to provide said differential output.

14. The device according to claim 13 including first and second reference tubes directed to said first and third diaphragms to cause said first and third diaphragms to provide a differential pressure output.

15. A redundant pressure sensing device for providing a first and a second output proportional to at least a first and a second applied pressure and irrespective of vibration and acceleration of said device, comprising:
   a semiconductor substrate having a first pressure sensing device including first and second deflectable diaphragms and a second pressure sensing device including third and fourth deflectable diaphragms,
   wherein the first and third deflectable diaphragms each have a top surface and a bottom surface adapted to respond to pressure, vibration, and acceleration,
   wherein the second and fourth deflectable diaphragms respond to vibration and acceleration but do not respond to pressure,
   a plurality of piezoresistors mounted on each deflectable diaphragm,
   wherein said plurality of piezoresistors on said first and second deflectable diaphragms are electrically coupled together to provide a first output that cancels out vibration and acceleration and is indicative of a first pressure; and
   wherein said plurality of piezoresistors on said third and fourth diaphragms are electrically coupled together to provide a second output that cancels out vibration and acceleration and is indicative of a second pressure.

16. The device of claim 15, wherein the first and second pressure sensing devices are identical in configuration.

17. The device according to claim 15 wherein said first and second outputs are absolute outputs.

18. The device according to claim 15 wherein said first pressure is applied to the top surface of said first diaphragm and said second pressure is applied to said top surface of said third diaphragm and first means for applying a third pressure to said bottom surface of said first diaphragm to cause said first output to be a differential output, and second means for applying a fourth pressure to said bottom surface of said third diaphragm to cause said second output to be a differential output.

19. The device of claim 15 wherein said first pressure is applied to said top surface of said first diaphragm and wherein second pressure is applied to said top surface of said third diaphragm and means for applying a pressure to the bottom surface of said first diaphragm to cause said first output to be a differential output and said second output to be an absolute output.

20. The device of claim 18 wherein said first means is a tube having an end communicating with said bottom surface of said first diaphragm and said other end adapted to receive said third pressure.

21. The device of claim 18 said second means is a tube having one end communicating with said bottom surface of said second diaphragm and said other end adapted to receive said fourth pressure 22. The device of claim 1, wherein the first and second pressure sensing devices are identical in configuration.

* * * * *